United States Patent [19]
Stall et al.

[11] Patent Number: 5,779,551
[45] Date of Patent: Jul. 14, 1998

[54] ROTATIONAL FIXED CONNECTION

[75] Inventors: Eugen Stall, Neunkirchen; Winfried Busch, Köln; Wolfgang Beigang, Ruppichteroth, all of Germany

[73] Assignee: GKN Automotive AG, Lohmar, Germany

[21] Appl. No.: 630,164

[22] Filed: Apr. 10, 1996

[30] Foreign Application Priority Data

Apr. 12, 1995 [DE] Germany .............. 195 13 905.4

[51] Int. Cl.$^6$ .................... F16D 3/205; F16D 3/226
[52] U.S. Cl. .................. 464/111; 403/284; 403/359; 464/146; 464/905; 464/906
[58] Field of Search ................ 464/111, 120, 464/123, 139, 141, 146, 157, 158, 179, 182, 905, 906; 403/274, 284, 359

[56] References Cited

U.S. PATENT DOCUMENTS

| | | | |
|---|---|---|---|
| 2,374,270 | 4/1945 | Brock | 403/279 |
| 3,073,635 | 1/1963 | Schaefer | 464/182 X |
| 4,768,990 | 9/1988 | Farell et al. | 464/111 |
| 5,533,825 | 7/1996 | Stone | 403/359 |
| 5,536,101 | 7/1996 | Schwarzler et al. | 403/274 X |

FOREIGN PATENT DOCUMENTS

| | | | |
|---|---|---|---|
| 1097515 | 7/1955 | France | 464/158 |
| 211018 | 12/1983 | Japan | 403/359 |
| 211019 | 12/1983 | Japan | 403/359 |
| 211020 | 12/1983 | Japan | 403/359 |
| 93/08409 | 4/1993 | WIPO | 464/111 |

*Primary Examiner*—Daniel P. Stodola
*Assistant Examiner*—Gregory J. Strimbu
*Attorney, Agent, or Firm*—Harness, Dickey & Pierce, P.L.C.

[57] ABSTRACT

A rotational fixed connection has a shaft whose axial end is provided with outer shaft teeth and a hub whose through-bore is provided with inner teeth. The connection is useful between a driveshaft in the driveline of a motor vehicle and a joint hub of a universal tripod joint or a constant velocity universal ball joint. The joints include the hub, torque transmitting roller elements, and an outer joint part. The outer shaft teeth of the shaft, at a distance from the hub teeth end at the shaft shank end, run out steplessly into the shaft shank. The outer shaft teeth end inside the hub with a stepped end. In the region following the outer shaft teeth, the shaft includes a tooth-free end portion. The tooth-free end portion carries or forms fixing elements which axially securingly rest against a hub end face at the end where the shaft terminates. The inner shaft teeth of the hub, at the end where the shaft terminates, includes a deformed portion which rests axially securingly against the end of the outer shaft teeth and prevents engagement therewith.

9 Claims, 6 Drawing Sheets

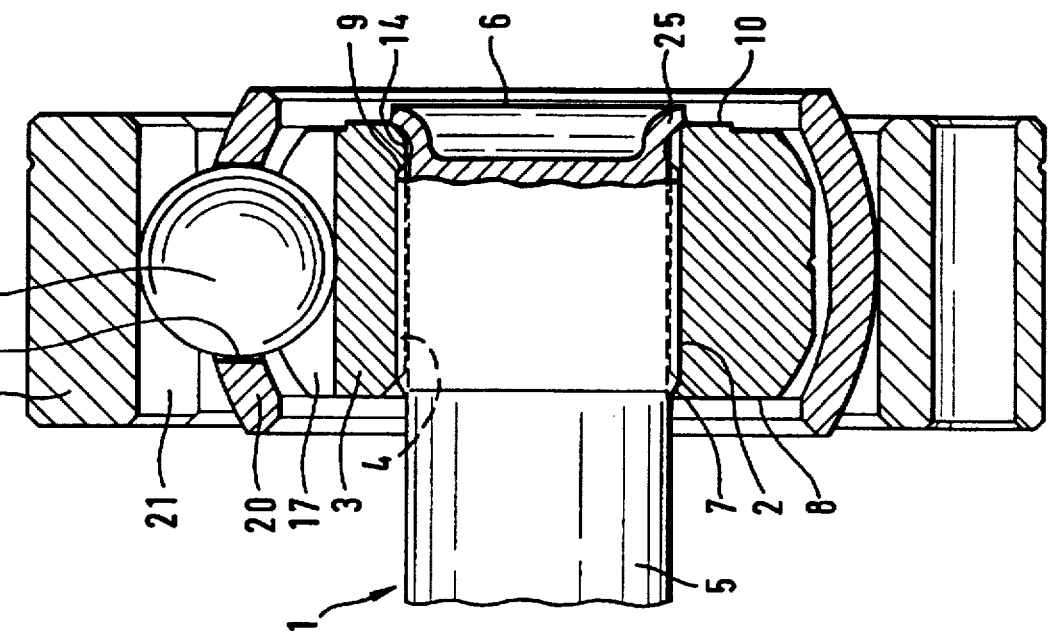

5,779,551

1

ROTATIONAL FIXED CONNECTION

BACKGROUND OF THE INVENTION

The invention relates to a rotational fixed connection, which includes a shaft with an axial end which includes outer shaft teeth and a hub with a through-bore including inner teeth to connect with the shaft. The connection is useful between a driveshaft in a driveline of a motor vehicle and a joint hub of a universal tripod joint or a constant velocity universal ball joint. The joints include a hub, torque transmitting roller elements, and an outer joint part.

A connection is disclosed in DE 42 40 131 C2, published Jun. 1, 1994. Here, it is advantageous if the outer shaft teeth are designed such that they run out steplessly into the shaft shank. As a result, any strength losses in the transition cross-section are largely reduced. In this case, the axial securing means are arranged at the shaft and behind the engaging torque transmitting teeth. The disadvantage of the connection described in the above publication refers to the shape and production of the hub. Production requires the inner shaft teeth inside a blind hole, and the required teeth accuracy along the entire axial length cannot be achieved in one single operation.

SUMMARY OF THE INVENTION

It is an object of the present invention to provide a connection of the initially mentioned type which improves production of the inner teeth of the hub and the axial securing means at the hub end. The objective is achieved by outer shaft teeth, at a distance from the hub teeth end at the shaft shank end, running out steplessly into the shaft shank; outer shaft teeth ending inside the hub with a stepped end; in the region following the outer shaft teeth, the shaft includes a tooth free end portion; the tooth free end portion carries or forms fixing elements which axially securingly rest against a hub end face at the end where the shaft terminates; and the inner shaft teeth, at the end where the shaft terminates, include a deformed portion which rests axially securingly against the end of the outer shaft teeth and prevent engagement therewith.

Accordingly, it is possible to produce the inner teeth of the hub by punching out and expanding a smooth through-aperture. This is accomplished, for example, by turning and subsequently broaching the inner teeth, and, after producing continuous inner teeth, deforming a portion thereof to prevent engagement of the outer shaft teeth and constitute the axial securing means. The deformation of the portion may refer to all the teeth but it may also be limited to two opposed teeth or toothed regions or three uniformly circumferentially distributed teeth or toothed regions.

According to a first embodiment, the deformed portion may be obtained by setting or bending over the teeth at the end of the straight inner teeth. For this purpose it is possible, for example, to insert a straight-toothed tool provided with counter teeth into the hub being clamped in and subject it to a high moment.

According to a further embodiment it is possible to twist the tooth ends of the straight inner teeth in the deformed portion helically. For this purpose, for example, a tool with helical counter teeth may be introduced axially into the hub being clamped in while applying a high force, without permitting mutual rotating.

According to further embodiments it is possible, in the deformed portion, to radially upset the straight inner teeth and to widen them in cross-section, especially at the tooth

2 base or to upset them axially and, in consequence, to increase the tooth height at the transition to the undeformed region. For this purpose, it is possible either to use an expanding tool which is introduced at a certain depth and then expanded or a simple expanding mandrel may be introduced with a high axial force into the clamped-in hub down to a certain depth.

In all embodiments according to the invention, the deformed portion in the inner teeth forms an axial stop relative to the outer shaft teeth end where the shaft terminates. The axial stop prevents the hub from sliding any further onto the shaft.

The deformed portion of the inner teeth of the hub should preferably be formed before the ball tracks or tripod arms at the hub are machined any further in order to prevent any distortions occurring at the surfaces.

Means to axially secure the hub towards the shaft end may be provided according to one of the embodiments already described above. Preferably, securement is such that the shaft, at its end, includes a recess and final collar and a securing ring engages the recess. The securing ring is supported on the collar and rests against the shaft end face where the shaft terminates. In another embodiment, the shaft, at its end, includes a beaded portion which rests directly against the hub end face where the shaft terminates. The beaded portion may be in the form of a cylindrical sleeve which is turned at the shaft end and which is expanded after the hub has been slid on.

The combination of characteristics as proposed by the invention achieves advantageous load conditions in the region where the outer shaft teeth change into the shaft shank and simplifies and improves the production of the inner teeth and of the stop means in the hub.

BRIEF DESCRIPTION OF THE DRAWINGS

FIG. 2a is a cross-section view of a constant velocity universal ball joint having a connection between the shaft and the hub in accordance with the invention.

FIG. 2b is a second embodiment including a beaded portion of a connection between the shaft and the hub in accordance with the invention.

DETAILED DESCRIPTION OF THE DRAWINGS

Figure 1:
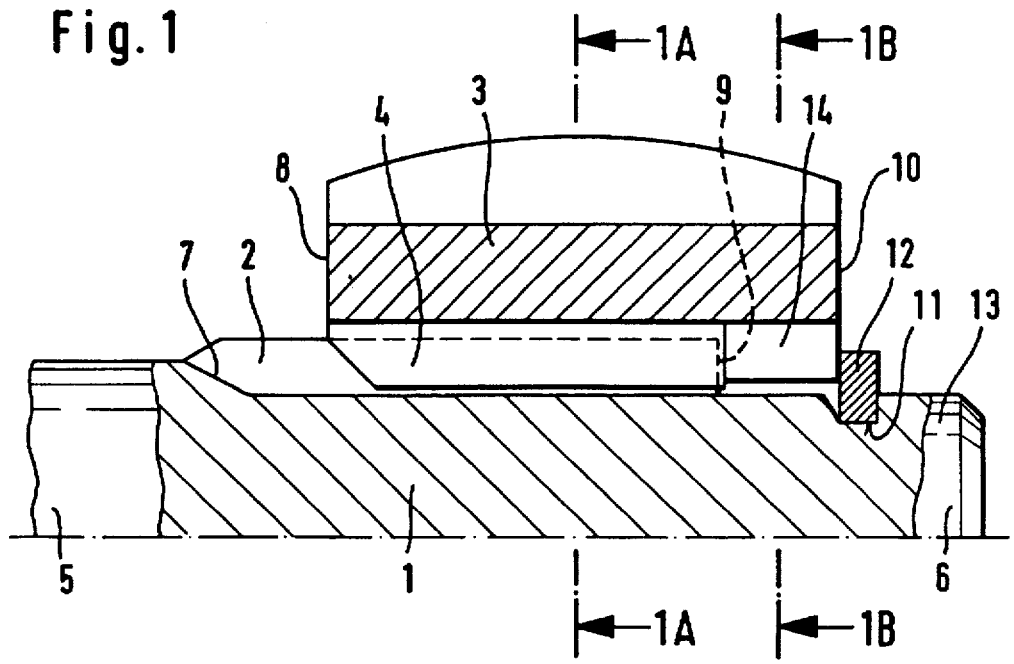
FIG. 1 is a longitudinal section view through a connection of a shaft and a hub in accordance with the invention.

FIG. 1 shows a shaft 1 with outer shaft teeth 2 and a hub 3 with inner shaft teeth. The two sets of teeth mutually engage one another and are axially secured relative to one another. The shaft 1 shows the start of the shaft shank to which the expression "end at the shaft shank end" refers. Furthermore, the shaft 1 shows the shaft end 6 to which the expression "where the shaft terminates" refers in connection with the shaft and hub.

The shaft teeth 2 run out steplessly into the shaft shank 5. The teeth run-out portion 7 has no particular function for the end 8 of the hub 3 at the shaft shank end. Thus, it can be produced without having to meet any special requirements in respect of production accuracy. For example, it can be manufactured by rolling the teeth or drawing the teeth from the shaft end.

Figure 1A:
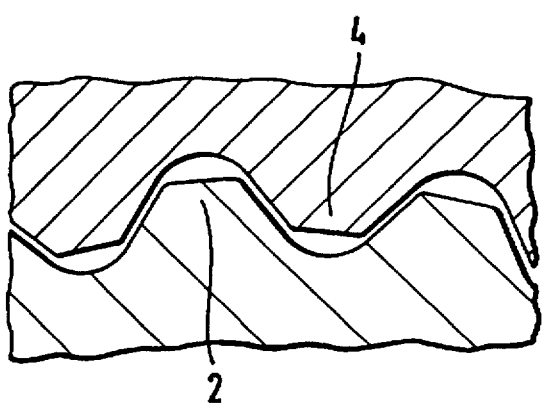
FIG. 1a is a partial cross-section view through the teeth according to FIG. 1, along the sectional line 1A—1A.

The teeth run-out portion 7 constitutes the optimum solution with respect to the strength transition between the shaft shank 5 and the shaft teeth 2. The stepped end 9 of the shaft teeth 2 positioned opposite the teeth run-out portion 7 rests inside the hub 3 at a distance from the end face 10 of the hub 3 located where the shaft terminates. Adjoining the end 9 of the shaft teeth 2, the shaft end 6 includes a reduced smooth diameter with a recess 11. The recess 11 holds a securing ring 12 which is supported on a collar 13 positioned adjacent and formed by the recess. Due to the hub 3 resting against the securing ring 12 and the securing ring 12 resting against the collar 13, the hub 3 is axially secured relative to the shaft 1 towards the shaft end. The inner teeth 4 of the hub 3 are formed in the usual way as far as the end 9 of the outer teeth 2 of the shaft 1 and engages the outer teeth as shown in Section 1A—1A of FIG. 1a.

Figure 1B:
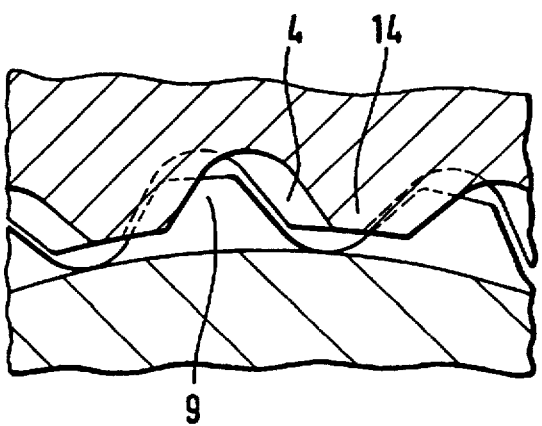
FIG. 1b is a partial cross-section view through the teeth according to FIG. 1, along the sectional line 1B—1B.

The hub 3, in a region immediately adjoining the end 9 of the outer shaft teeth, includes a deformed portion 14. The deformed portion may be produced as continuous straight inner shaft teeth together with the inner teeth 4 of the hub, while having the same profile, and subsequently it may be subjected to a deformation operation. The result of the deformation operation is shown in Section 1B—1B according to FIG. 1b. As compared to the teeth portion (illustrated in dashed lines) of the inner shaft teeth of the hub, the teeth of the deformed portion 14 are circumferentially twisted relative to the hub axis. Thus, the deformed portion stops against the teeth ends 9 (shown in a plan view) of the outer shaft teeth 2. In consequence, the hub 3 is axially secured relative to the shaft 1 to prevent the hub 3 from being slid on any further towards the shaft shank 5.

The illustrated offset of the deformed region 14 can be achieved by circumferentially setting or bending over the teeth near the teeth end 9 of the outer shaft teeth 2. However, continuous twisting of the teeth achieves the same functional results. A further possibility includes flattening and thus widening the teeth, or any other deformation process, which prevents a proper engagement between the deformed portion 14 and the outer shaft teeth 2. To simplify the embodiment and production process, it is also possible to deform only individual teeth in the above-described way. In this case, for example, two opposed teeth or better still, three uniformly circumferentially distributed teeth or correspondingly arranged groups of teeth may be deformed.

FIGS. 2a and 2b show a connection, in accordance with the invention, of the type illustrated in FIG. 1. In FIG. 2a, the connection is almost identical to FIG. 1 and in FIG. 2b, the connection in accordance with the invention deviates slightly in that the hub constitutes the ball hub of the constant velocity universal ball joint. Identical details have been given identical reference numbers, with reference being made to the description of FIG. 1. The hub 3 shows one of a plurality of circumferentially distributed ball tracks 17. The joint is completed by an outer joint part 19 and a ball cage 20. The outer joint part 19 includes further ball tracks 21 of which, again, one is shown. The ball tracks 17, 21 hold one of a plurality of torque transmitting balls 18. The cage 20 is provided with cage windows 22 which accommodates the ball 18, one of which is shown in section. The joint shown is a standard VL joint wherein the tracks 17, 21 form an angle of intersection relative to one another.

In FIG. 2a, the details of the connection correspond to those of FIG. 1, with the exception of the different dimensions of the deformed region 14, the groove 11, the securing ring 12 and the collar 13 as well as a deviating shape of the teeth run-out portion 7.

FIG. 2b, instead of the above-mentioned securing means, a continuous beaded portion 25 is illustrated. The beaded portion 25 rests directly against the hub 3 end face 10 in the region where the shaft terminates. The beaded portion 25 may be formed from an originally cylindrical, turned portion at the end 6 of the shaft 1, after the hub 3 has been slid on.

Figure 3A:
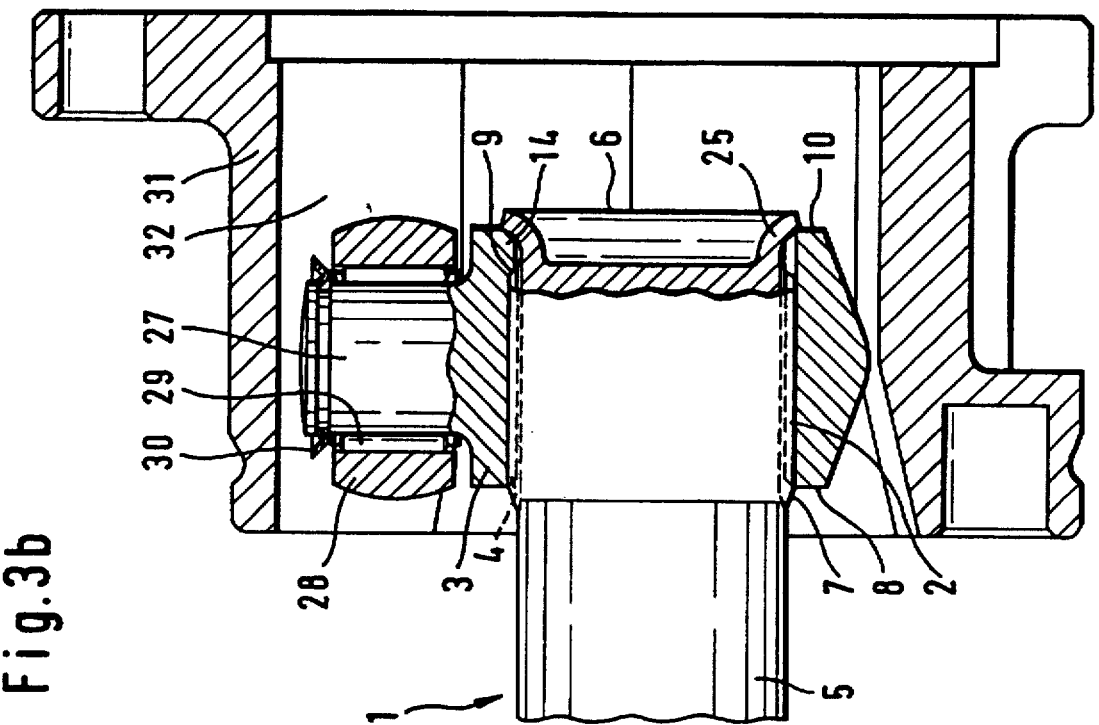
FIG. 3a is a cross-section view of a universal tripod joint with a connection between the shaft and the hub in accordance with the invention.
Figure 3B:
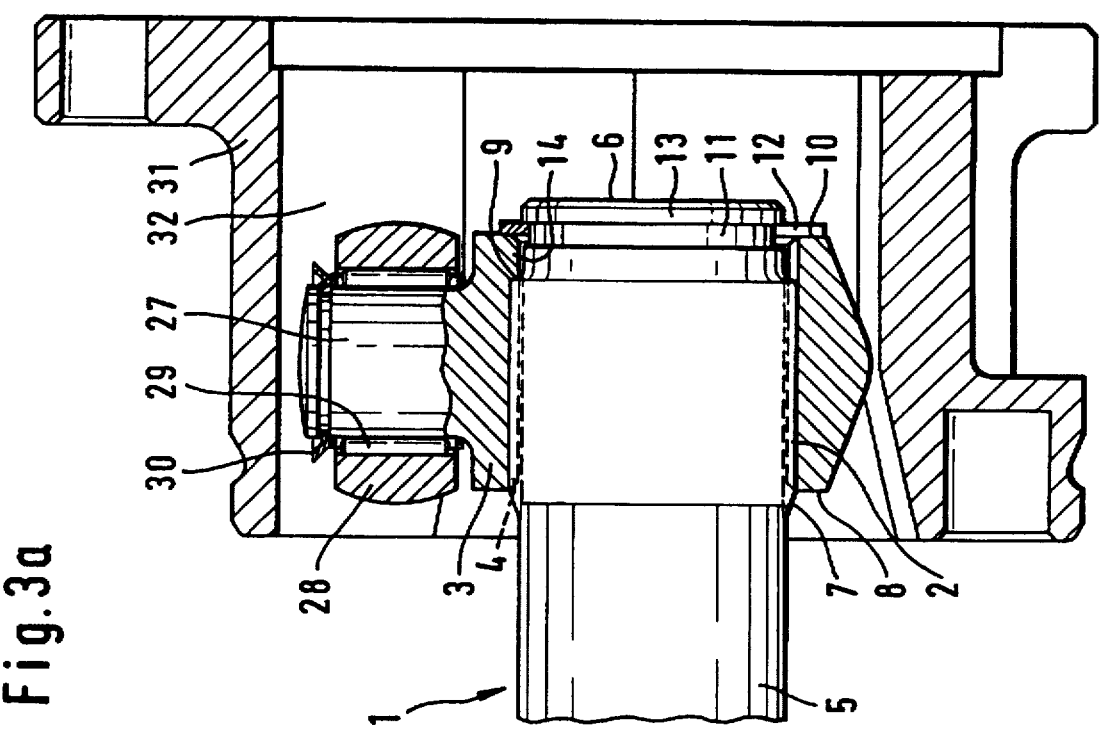
FIG. 3b is a second embodiment comprising a beaded portion of a connection between the shaft and the hub in accordance with the invention.

FIGS. 3a and 3b each show a connection in accordance with the invention wherein the hub constitutes the tripod of a tripod joint. The embodiment shown in FIG. 3a is similar to the type illustrated in FIG. 1. The embodiment shown in FIG. 3a is slightly modified with respect thereto.

Identical details have been given identical reference numbers, with reference made to the description of FIG. 1. The hub 3 shows one of three circumferentially distributed tripod arms 27. The joint is completed by an outer joint part 31 with longitudinally extending tracks 32 of which, again, one is shown. A plurality of rollers 28 are arranged on each tripod arm 27. The plurality of rollers 28 are rotatably supported by a needle bearing 29 and axially secured by securing means 30. The joint shown is a standard tripod joint of a simple design.

In FIG. 3a, the details of the connection correspond to those of FIG. 1, with the exception of the modified dimensions of the deformed region 14, the groove 11, the securing ring 12 and the collar 13, as well as a deviating shape of the teeth run-out portion 7.

FIG. 3b, instead of the above-mentioned securing means, includes a continuous beaded portion 25. The beaded portion 25 rests directly against the hub 3 end face 10 in the region where the shaft terminates. The beaded portion 25 may be formed of any originally cylindrical, turned portion at the end 6 of the shaft 1 after the hub 3 has been slid on.

Figure 4:
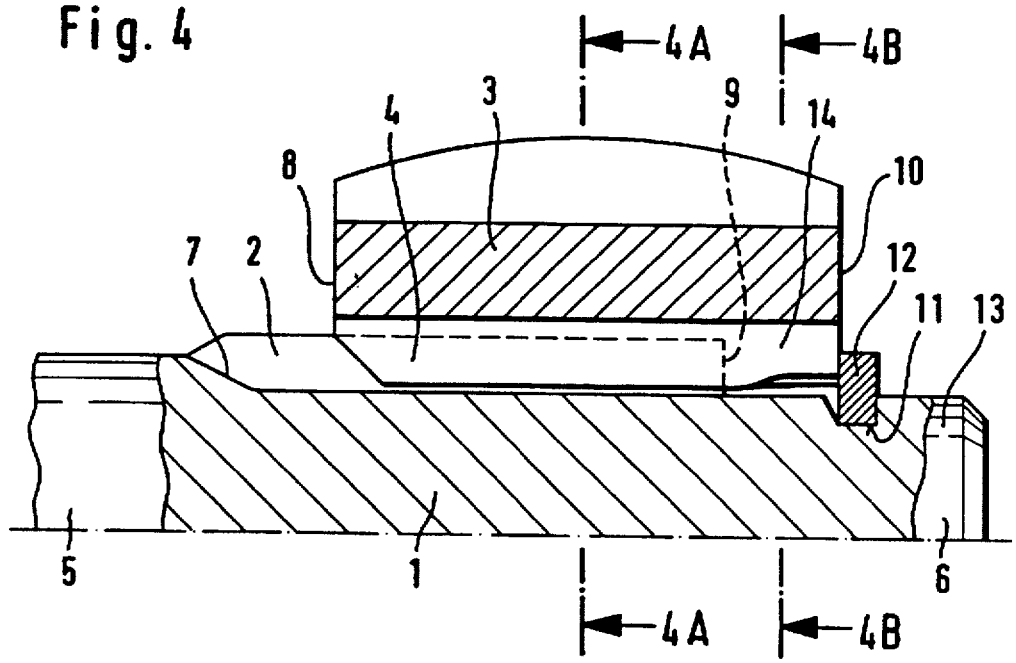
FIGS. 4, 4a and 4b are like those of FIGS. 1, 1a and 1b of another embodiment with a helical twisted deformed portion.
Figure 4A:
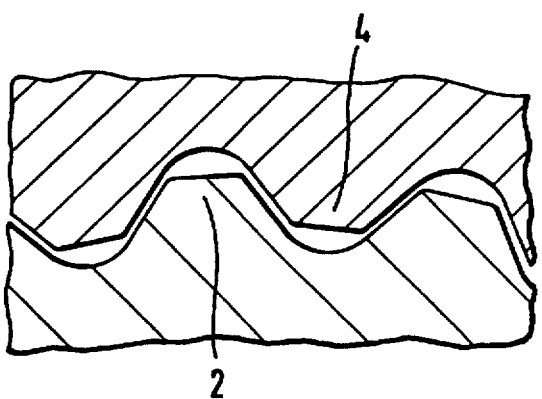
Figure 4B:
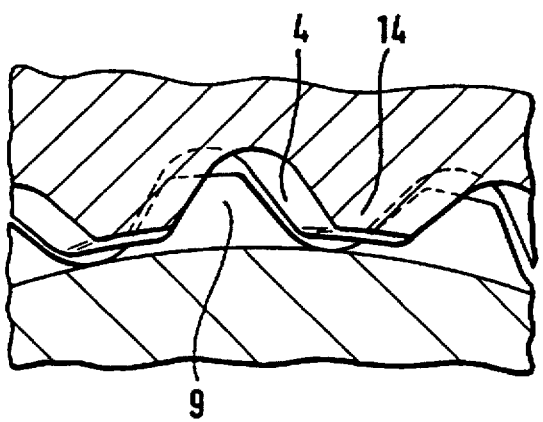

In FIG. 4, the deformed portion 14 is helically twisted compared to FIG. 1 where the portion 14 is circumferentially set with respect to the position of the teeth 4 in FIG. 4a.

Figure 5:
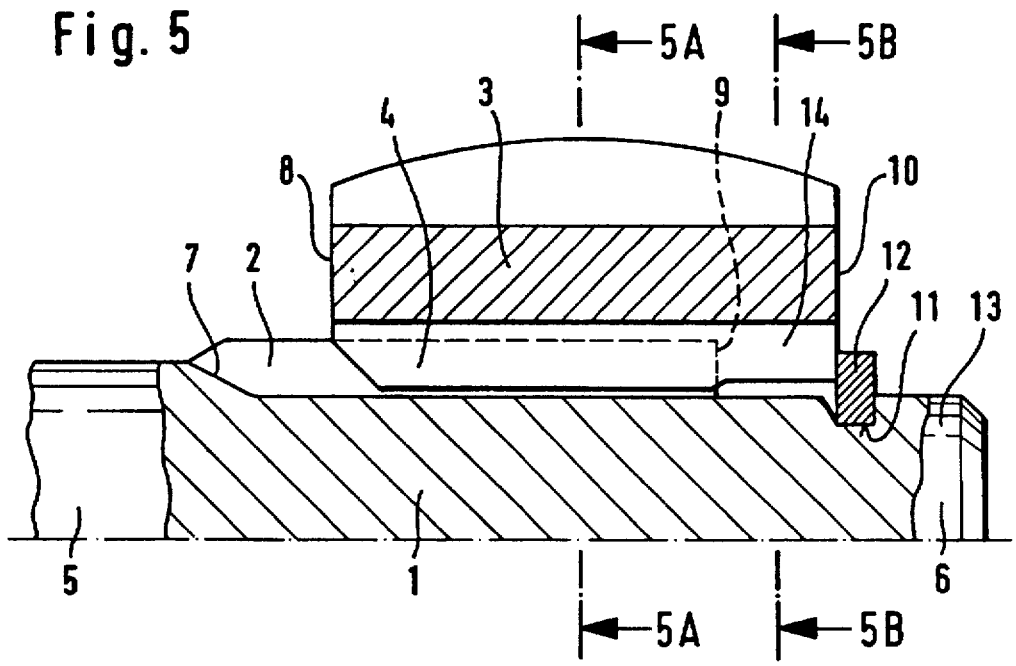
FIGS. 5, 5a and 5b are like those of FIGS. 1, 1a and 1b of another embodiment with the deformed portion widened.
Figure 5A:
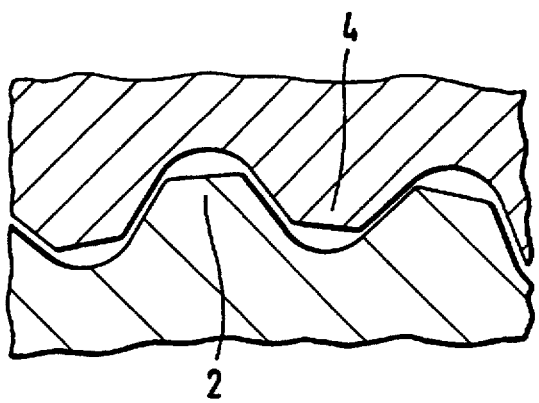
Figure 5B:
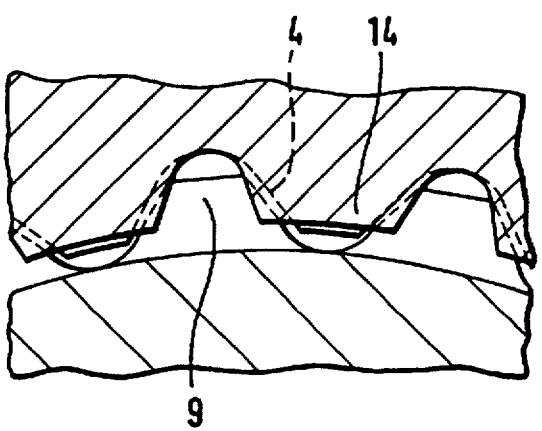

In FIG. 5b, the deformed portion 14 is radially deformed and thereby widened compared to its original form which is identical to the form of the teeth 4 in FIG. 5a.

Figure 6:
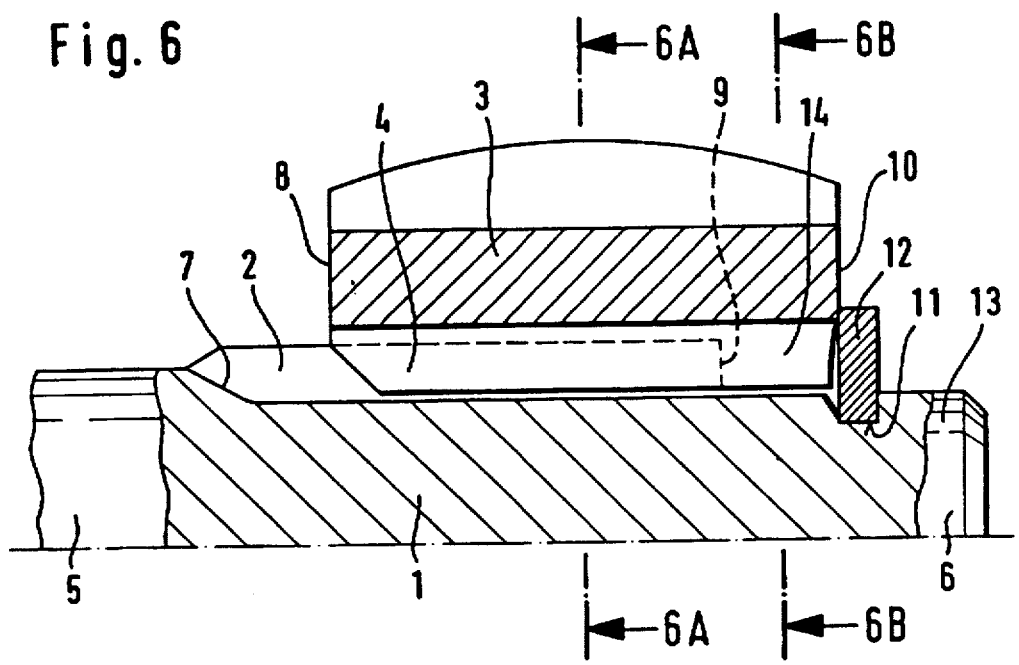
FIGS. 6, 6a and 6b are like those of FIGS. 1, 1a and 1b with the deformed portion increased in width and height.
Figure 6A:
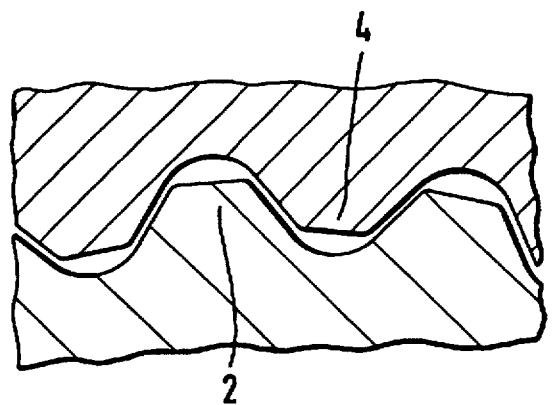
Figure 6B:
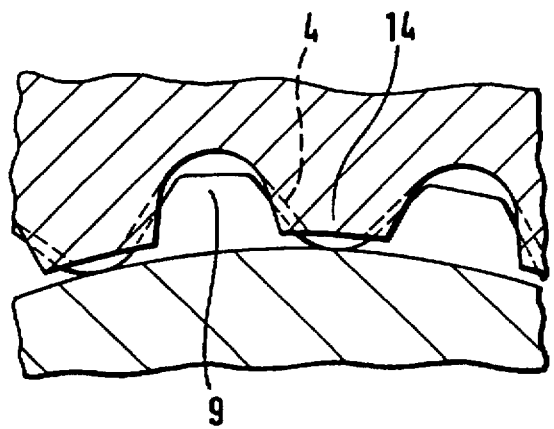

In FIG. 6, the deformed portion 14 is axially deformed, thereby increasing the width and height as shown in FIG. 6b compared with its original shape which is in accordance with the teeth 4 of FIG. 6a. The axial deformation requires for a larger securing ring 12 for abutment with the face 10 of the hub 3.

While the above detailed description describes the preferred embodiment of the present invention, the invention is susceptible to modification, variation and alteration without deviating from the scope and fair meaning of the subjoined claims.

We claim:

1. A rotationally fixed connection comprising:
   a shaft including an axial end and said shaft having outer shaft teeth;

a hub including a through-bore and said hub having hub teeth extending within said through-bore, said shaft outer shaft teeth run out into the shaft shank toward the shaft shank at a distance from an end of the hub teeth;

said outer shaft teeth end inside the hub, a stepped end is formed at an end said outer shaft teeth inside the hub;

said shaft having a tooth-free end portion in a region following the end of the outer shaft teeth, said tooth-free end portion including means for retaining said hub axially securingly resting against a hub end face nearest the axial end of the shaft; and the hub teeth, at the axial end of the hub are deformed to provide a portion which axially securingly rests against the stepped end, said deformed portion prevented from engaging with the outer shaft teeth, said deformed portion of said hub teeth extends adjacent the stepped end of said outer shaft teeth inside the hub towards the axial end of the shaft.

2. A connection according to claim 1, wherein the shaft tooth free end portion includes a recess and a collar, said recess accommodates a securing ring which is supported in the recess against the collar and the securing ring rests against the hub end face at the axial end of the shaft.

3. A connection according to claim 1, wherein the shaft tooth free end portion includes a beaded portion which rests directly against the hub end face at the axial end of the shaft.

4. A connection according to claim 1, wherein the deformed portion includes at least one individual helically twisted hub tooth.

5. A connection according to claim 1, wherein the deformed portion includes at least one individual hub tooth which, relative to a starting shape, is set.

6. A connection according to claim 1, wherein the deformed portion includes at least one individual hub tooth which is radially upset.

7. A connection according to claim 1, wherein the deformed portion includes at least one individual hub tooth which is axially widened.

8. A method of producing a hub for connection with a shaft having outer shaft teeth with a stepped end formed at the end of the outer shaft teeth, the method comprising providing a hub including a through bore, said hub having hub teeth extending within said through bore such that, when connected with the shaft, the stepped end of the outer shaft teeth are inside the hub; deforming a portion of the hub teeth at an axial end of the hub to provide a portion which is adapted to axially securingly rest against the stepped end, said deformed portion prevented from engaging with the outer shaft teeth.

9. A constant velocity joint and shaft connection comprising:

a shaft including an axial end, said shaft having outer shaft teeth;

a hub, torque transmitting roller elements, and an outer joint part forming said constant velocity joint, said hub including a through-bore and said hub having hub teeth extending within said through-bore, said outer shaft teeth of the shaft run out into the shaft shank toward the shaft shank at a distance from an end of the hub teeth;

said outer shaft teeth end inside the hub, a stepped end is formed at an end of said outer shaft teeth inside the hub;

said shaft having a tooth-free end portion in a region following the end of the outer shaft teeth, said tooth-free end portion including means for retaining said hub axially securingly resting against a hub end face nearest the axial end of the shaft; and the hub teeth, at the axial end of the shaft are deformed to provide a portion which axially securingly rests against the stepped end, said deformed portion prevented from engaging with the outer shaft teeth, said deformed portion of said hub teeth extends adjacent the stepped end of said outer shaft teeth inside the hub towards the axial end of the shaft.

* * * * *

UNITED STATES PATENT AND TRADEMARK OFFICE
CERTIFICATE OF CORRECTION

PATENT NO. : 5,779,551
DATED : July 14, 1998
INVENTOR(S) : Eugen Stall, Winfried Busch, Wolfgang Beigang It is certified that error appears in the above-identified patent and that said Letters Patent is hereby corrected as shown below:

On the cover page, the second inventor's place of residence is incorrect:

under [75] Inventors: "Winfried Busch, Köln" should be
--Winfried Busch, Hennef--

Column 5, line 6, Claim 1, after "end" insert --of--

Column 5, line 12, Claim 1, after "hub" (second occurrence) insert --nearest the shaft end--

Column 6, line 29, Claim 9, after "the" (third occurrence) insert --hub nearest the--

Column 6, line 29, Claim 9, after "shaft" insert --end--

Signed and Sealed this

Twenty-seventh Day of July, 1999

Attest:

Q. TODD DICKINSON

*Attesting Officer*  *Acting Commissioner of Patents and Trademarks*